United States Patent [19]

Bonzer et al.

[11] Patent Number: 4,559,669
[45] Date of Patent: Dec. 24, 1985

[54] SHOCK RESISTANT CASTER HAVING PRESSURE PLATES AND CENTERING PROJECTIONS

[75] Inventors: Richard C. Bonzer; Frederick C. Greene, both of Long Beach, Calif.

[73] Assignee: Darnell Corporation, Ltd., Downey, Calif.

[21] Appl. No.: 618,345

[22] Filed: Jun. 7, 1984

[51] Int. Cl.⁴ .............................................. B60B 33/00
[52] U.S. Cl. .......................................... 16/44; 16/45; 16/DIG. 36; 267/21 R; 267/63 R
[58] Field of Search .......... 16/18 R, 44, 45, DIG. 36; 267/21 R, 21 A, 63 R, 153

[56] References Cited

U.S. PATENT DOCUMENTS

| | | | |
|---|---|---|---|
| 1,745,992 | 2/1930 | Herold. | |
| 1,902,726 | 3/1933 | Schacht | 16/45 |
| 3,214,785 | 11/1965 | Chroust | 16/45 X |
| 3,566,433 | 3/1971 | Lewin | 16/44 |
| 4,067,083 | 1/1978 | Greene | 16/45 |
| 4,188,048 | 2/1980 | Haung et al. | 16/44 X |
| 4,346,498 | 8/1982 | Welsch et al. | 16/44 |
| 4,462,138 | 7/1984 | Black | 16/44 |
| 4,485,521 | 12/1984 | Welsch et al. | 16/44 |

FOREIGN PATENT DOCUMENTS 860352 2/1961 United Kingdom ................... 16/44

Primary Examiner—Fred Silverberg
Attorney, Agent, or Firm—William P. Green

[57] ABSTRACT

A shock resistant caster includes two structures one of which is connectable to a unit to be supported, and the second of which carries a wheel and is connected to the first structure for pivotal movement relative thereto. A cushion formed of elastomeric material is positioned to be compressed upon imposition of a load on the caster, to attain a cushioned support of the load, and may be held in position by a locating pin connected to one of the two relatively movable structures and extending through a passage in the cushion. The wheel preferably has an elastomeric portion formed of a material which is softer than the elastomeric material of the cushion, with the overall effect of the entire assembly being to produce a ride which is soft under low load conditions and becomes progressively stiffer in non-linear fashion as the load increases to optimize the support of the carried unit under all conditions.

11 Claims, 7 Drawing Figures

SHOCK RESISTANT CASTER HAVING PRESSURE PLATES AND CENTERING PROJECTIONS

BACKGROUND OF THE INVENTION

This invention relates to improved casters and particularly to casters of a type having a capacity for resisting or absorbing heavy shock forces, such as may occur if a unit supported by the caster is suddenly dropped or a sudden vertical shock force is otherwise applied to it.

There are on the market casters which are intended to be shock absorbing in use, and which to attain that purpose include a first body structure connectable to a unit to be supported and a second body structure carrying a floor engaging wheel and which is connected pivotally to the first structure for deflection relative thereto upon imposition of a load on the caster. Such pivotal movement is usually resisted by one or more coil springs acting against the wheel carrying structure in a manner urging the wheel downwardly against the floor. Unfortunately, such devices do not produce as effective a shock absorbing action as would be desired since the springs in order to absorb high load forces without bottoming out under heavy load conditions must be too stiff to attain any substantial cushioning effect under light loads.

U.S. Pat. Nos. 1,745,992, 3,566,433 and 4,346,498 show devices of the above discussed general type in which elastomeric cushions have been utilized in lieu of coil springs as the shock absorbing elements.

SUMMARY OF THE INVENTION

A major purpose of the present invention is to provide an improved shock resisting caster which is capable of affording cushioned support to a highly sensitive piece of equipment, such as a delicate computer or other similar electronic or electrical device over a very wide range of load conditions. A caster embodying the invention may provide a very soft cushioning effect under normal handling conditions, as when the unit is being wheeled from one location to another on a relatively smooth surface, but under other circumstances, when greater load forces are encountered, the caster may automatically convert to a more resistant condition in which it can take those heavy forces effectively, as for instance if a relatively heavy supported unit is dropped several inches or more to a floor surface and its casters then strike the floor under a high load of say fifteen to twenty G. To achieve this wide range cushioning effect, the load forces are taken partially by an elastomeric cushioning part which resists relative pivotal movement of two sections of the caster, and partially by an elastomeric portion of the caster wheel. A particular feature of the invention resides in certain advantages which are attained by forming the elastomeric cushion of a material which is substantially harder than the elastomeric portion of the wheel, so that under low load conditions a soft cushioning effect is attained by the wheel without substantial deformation of the harder cushioning element, and under higher loads the harder element deforms to allow pivotal movement of the wheel carrying part and cushion the load non-linearly up to extremely high G forces as discussed. For best results, the elastomeric portion of the cushion should have a Shore hardness on the A scale which is at least about 10 points, and optimally between about 20 and 25 points, higher than the elastomeric material of the wheel.

The cushion may be received and confined between two spaced generally vertical walls of one of the relatively pivotally movable sections of the caster, with the cushion being held in place by extension of a locating part from one of those walls through a passage in the cushion toward the other wall. The cushion may also have localized projections at its opposite sides engageable with these walls in locating relation. Pressure plates associated with the two relatively pivotally movable parts or structures of the caster assembly may engage upper and lower sides of the elastomeric cushion to compress it vertically as the load increases on the wheel. An upper one of the pressure plates may be formed as a portion of a pressure element which is interposed vertically between the cushioning part and an upper wall of the structure or part which is connected to the unit being supported.

BRIEF DESCRIPTION OF THE DRAWINGS

The above and other features and objects of the invention will be better understood from the following detailed description of the typical embodiment illustrated in the accompanying drawings, in which.

DESCRIPTION OF THE PREFERRED EMBODIMENTS

Figure 1:
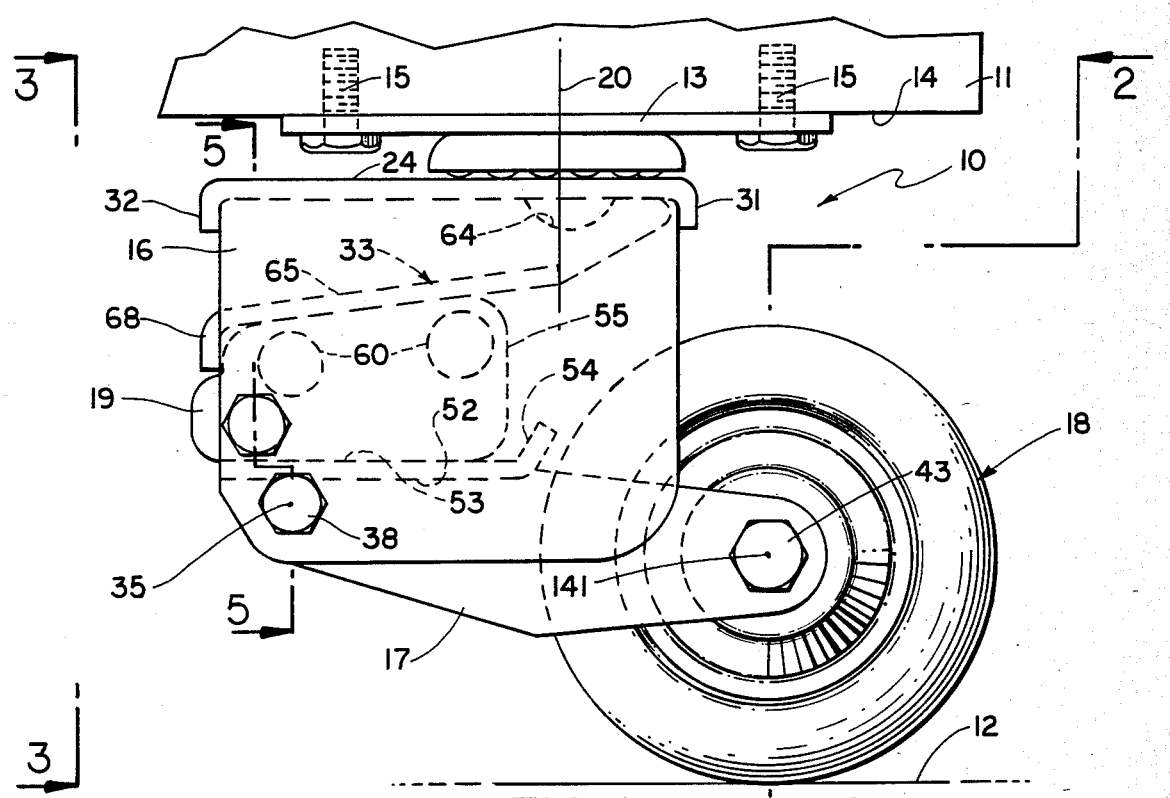
FIG. 1 is a side view of a caster embodying the invention.

The castor 10 illustrated in the drawings may be one of several identical castors connected to the underside of a computer 11 or other unit which is to be supported by the casters for movement along a horizontal floor surface 12. The caster 10 includes a top horizontal mounting plate 13 which may be rectangular and be rigidly connected to the undersurface 14 of unit 11 by screws 15. The plate 13 carries a main body part or structure 16 which in turn pivotally carries a second structure or part 17 to which there is rotatably mounted a wheel 18 for engaging floor surface 12. A cushioning block of elastomeric material 19 yieldingly resists deflection of the wheel carrying part 17 to absorb or resist shock forces to which the unit 11 and wheels are subjected.

The caster as illustrated in the drawings is typically shown as a swivelling type caster, in which the main body part 16 is connected to mounting plate 13 for relative pivotal movement about a vertical axis 20. It is contemplated, however, that the invention may if desired be applied to a rigid or stationary type caster, in which event the main body part 16 may be connected rigidly to mounting plate 13 by a vertical pin 21 extending along axis 20 and retaining in assembled condition the elements 13 and 16 as well as an upper series of ball bearings 22 confined between an upper annular race element 23 and the top horizontal wall 24 of part 16, and a lower series of ball bearings 25 confined between an annular race element 26 and the underside of wall 24, to effectively mount the part 16 for its desired swiveling movement in a known manner.

Body part 16 may be stamped from a fairly heavy gauge rigid sheet metal, deformed to provide the upper horizontal wall 24 of the part and two parallel vertical downwardly projecting side walls 27 and 28 which lie essentially in two vertical planes 29 and 30 disposed parallel to and equidistant from a central vertical front to rear plane 131 of the device. The top horizontal wall 24 of part 16 may be rectangular in horizontal outline, and the two side walls 27 and 28 may be essentially rectangular and of the configuration illustrated in FIG. 1. At its front and rear ends, the top wall 24 may carry flanges 31 and 32 which are formed from extremities of the horizontal wall 24 turned downwardly to directly vertically extending condition as illustrated in FIG. 4, for the purpose of retaining an upper pressure element 33 as will be discussed in greater detail at a later point.

Near the lower edges of side walls 27 and 28, these walls contain two horizontally aligned circular openings 34 which are centered about a horizontal axis 35 extending perpendicular to the planes 29 and 30 of side walls 27 and 28. A cylindrical pivot pin 36 extends through openings 34 and is a close fit therein, and acts to mount the wheel carrying part 17 for pivotal movement about axis 35. The pin 36 is retained by providing one end thereof with an enlarged head 37 receivable at the outside of one of the side walls, and by connecting a nut 38 threadedly to its opposite end at the outer side of the second side wall.

Figure 2:
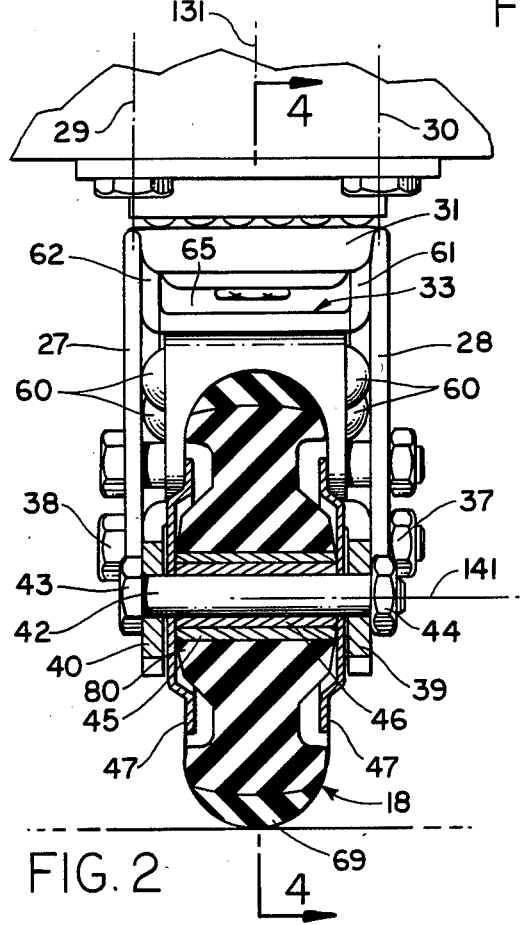
FIG. 2 is a vertical section on line 2—2 of FIG. 1.

Part 17 may be stamped from rigid sheet metal, deformed to provide two spaced parallel vertical arms 39 and 40 rigidly interconnected by upper pressure plate portion 31 of part 17. Part 17 is mounted for its pivotal movement by extension of pin 36 through carrier openings in arms 39 and 40, with the upper surface of the pin preferably engaging portion 31 of part 17 along the entire distance between arms 39 and 40 to transmit load supporting forces very effectively between the pin and part 17. At their forward ends, the two identical arms 39 and 40 rotatably carry wheel 18, which turns relative to part 17 about a horizontal axis 141 parallel to axis 35. The wheel may be mounted by a shaft or pin extending through aligned openings in arms 39 and 40 and having a head 43 at the outer side of one arm and a nut 44 threadedly connected onto the shaft at the outer side of the other arm. As seen in FIG. 2, the wheel has an annular peripheral tire-like portion 69 molded of a resiliently deformable elastomeric material, preferably neoprene rubber, and centered about axis 141. This tire portion 69 may be bonded annularly to a circular core 80 of rigid material containing and bonded to a rigid tubular bearing element 45, which is rotatable about a sleeve or bushing 46 carried about shaft 42. Two annular guard plates 47 may be provided at opposite sides of the wheel. The core 80 of the wheel may be molded of hard rubber, compounded to be substantially nondeformable under the high load forces encountered in use of the caster.

Figure 4:
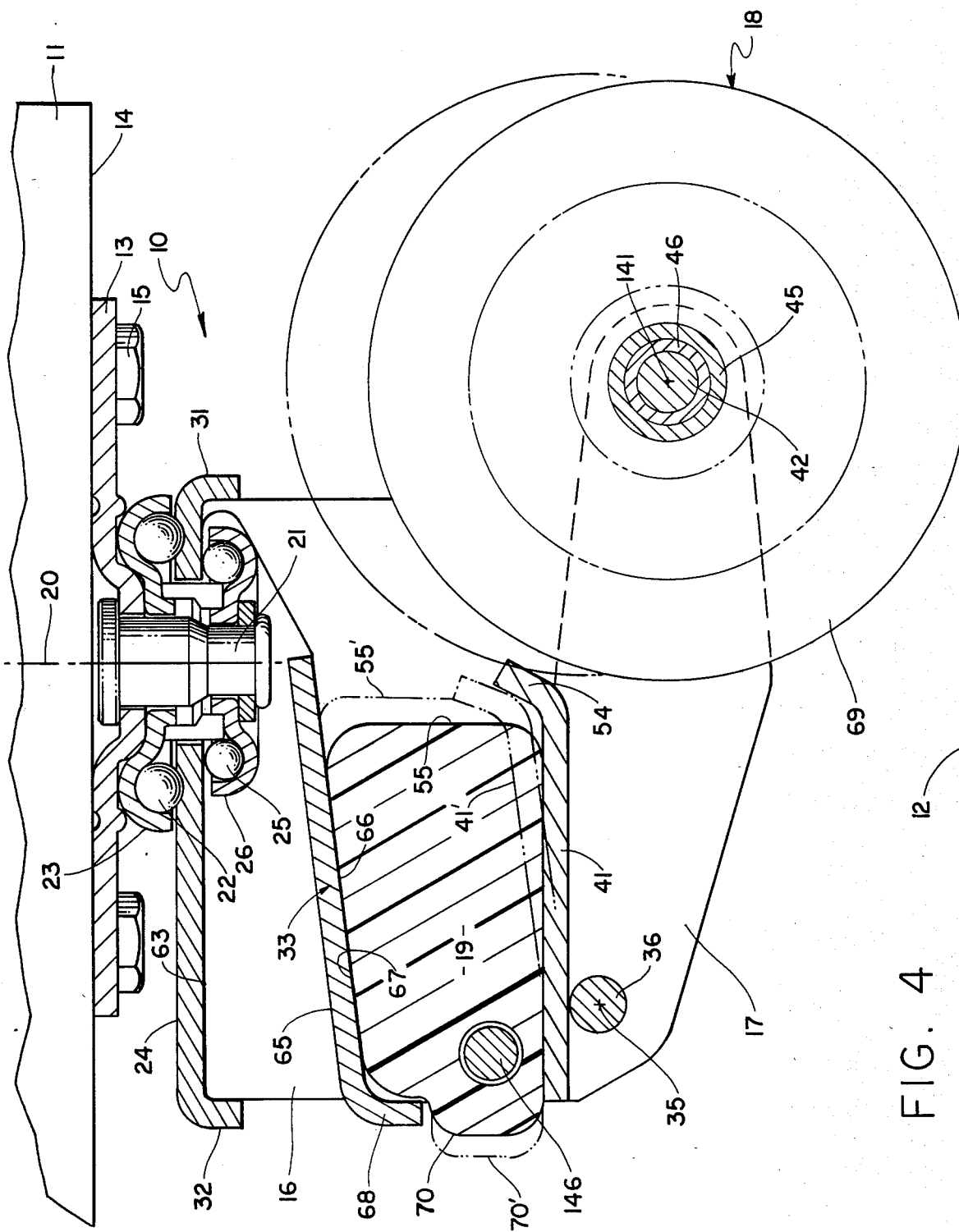
FIG. 4 is an enlarged central vertical sectional view taken on line 4—4 of FIG. 2.
Figure 5:
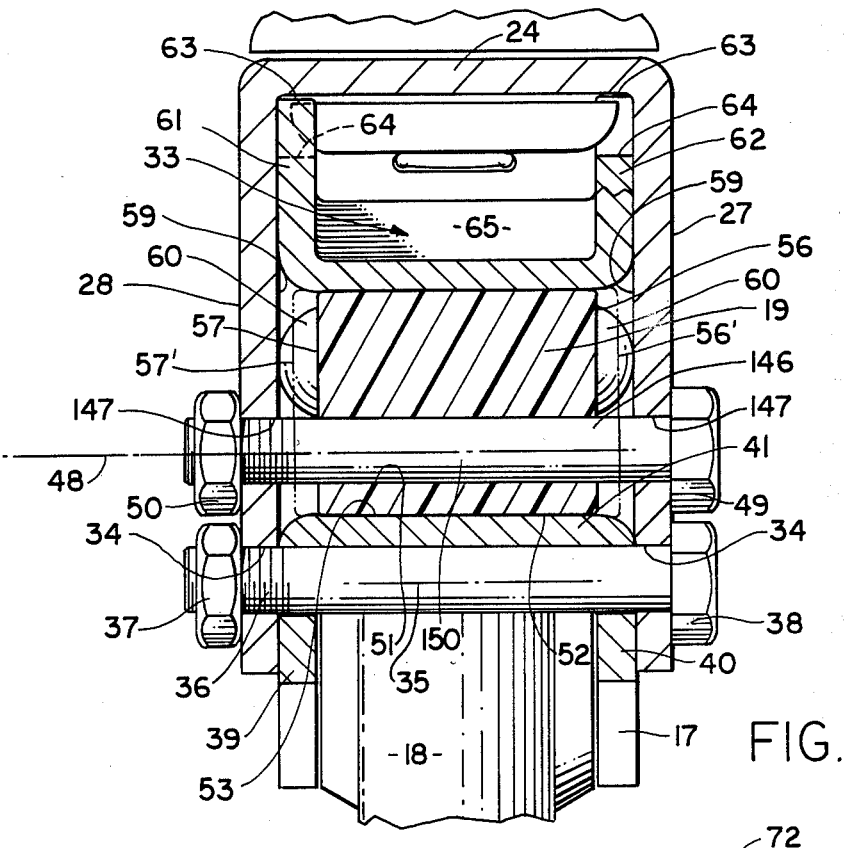
FIG. 5 is an enlarged fragmentary vertical section taken on line 5—5 of FIG. 1.

Pivotal movement of the wheel carrying the arm 17 in a counterclockwise direction as viewed in FIGS. 1 and 4 is resisted by an elastomeric block or cushion 19 interposed vertically between upper pressure element 33 and pressure plate portion 41 of part 17. This block is interposed between the two side walls 27 and 28 of body part 16, and is located relative thereto by a pin 146 (FIG. 5) extending through horizontally aligned openings 147 in side walls 27 and 28 and extending along a horizontal axis 48 parallel to the two axes 35 and 141. The pin 146 may be located above the level of the previously mentioned pin 36 (see FIG. 5), and slightly to the left of pin 36 as viewed in FIG. 4. Pin 146 may have a head 49 at the other side of one of the vertical walls 27 and 28 and a nut 50 threadedly carried by the pin at the outer side of the other vertical wall to retain the pin in fixed assembled relation with respect to the other parts. The cylindrical portion 150 of pin 146 extending between the two side walls 27 and 28 extends through and is a close fit within a cylindrical passage 51 formed in block 19, to form a pivotal connection between the block and part 16 and effectively locate the block relative to part 16.

Figure 3:
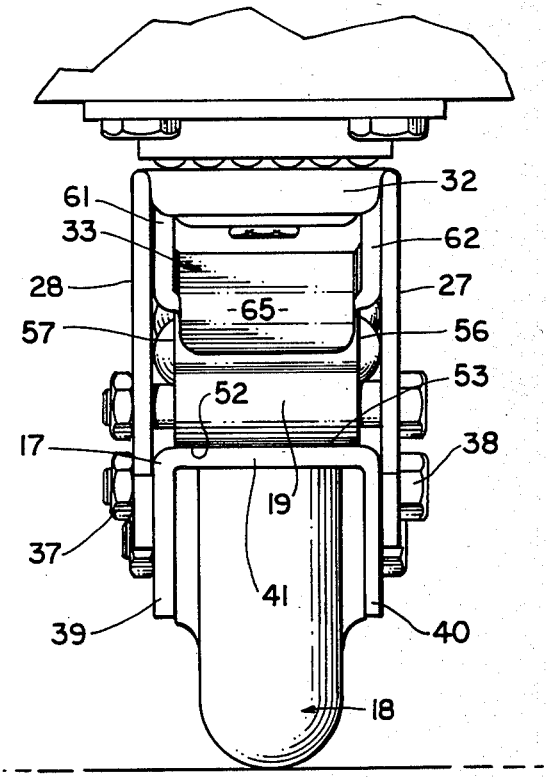
FIG. 3 is a rear elevational view taken on line 3—3 of FIG. 1.

At its underside, block 19 has a planar surface 52 which engages a correspondingly planar upper surface 53 of pressure plate portion 41 of part 17, with both of those surfaces 52 and 53 preferably being disposed substantially directly horizontally in the FIG. 1 normal condition of the caster in which only the weight of the unit 11 is supported on the caster without subjection of the unit or caster to shock loads of any type. At the forward end of block 19, part 17 may have an upwardly turned flange 54 receivable closely adjacent a forward vertical surface 55 of the block to add stiffness to part 17 and restrain deformation of surface 52 of part 19 during shock loading of the unit 10. At its opposite sides as viewed in FIG. 5, the elastomeric block 19 has two parallel opposite sides surfaces 56 and 57 which extend vertically and perpendicular to axes 35, 141 and 48, and which are parallel to and spaced inwardly from the inner surfaces 59 of the two side walls 27 and 28. The block 19 has the cross section illustrated in FIG. 4 through the entire thickness of the block between its two opposite side surfaces 56 and 57. At each of its sides, the block has two projections or lugs 60 formed of the same elastomeric material as the remainder of the block and preferably having the partial spherical configuration illustrated in the drawings, with these projections 60 being dimensioned to simultaneously lightly engage the inner surfaces 59 of the two side walls 27 and 28 in a manner effectively locating the block in centered position between the two side walls as illustrated in the end views FIGS. 2 and 3. The projections 60 occupy only a minor portion of the area of each of the sides of the block 19 to leave the sides of the block free for lateral expansion at other locations toward side wall surfaces 59 upon vertical compression of the block. The upper pressure element 33, like parts 13, 16 and 17, may be stamped from rigid sheet metal, deformed to form parallel vertical side walls 61 and 62 received adjacent and parallel to side walls 27 and 28 of body part 16, with these walls 62 having horizontal upper edges 63 engageable upwardly against the underside of horizontal top wall 24 of part 16. Walls 61 and 62 may be cut away at 64 at opposite sides of the swivel bearing assembly, to avoid interference therewith. Also, walls 61 and 62 have a length in a left to right direction as viewed in FIG. 4 corresponding to the spacing between the two end flanges 31 and 32 to be engageable therewith for retaining pressure element 33 against leftward or rightward movement as seen in FIG. 4.

Walls 61 and 62 of pressure element 33 are formed integrally with a planar pressure plate portion 65 of element 33, which extends generally horizontally between the lower edges of walls 61 and 62 but is inclined to advance progressively downwardly as it advances in a leftward direction as viewed in FIG. 4. The inclined planar undersurface 66 of pressure plate portion 65 engages a correspondingly inclined planar upper surface 67 of elastomeric block 19, to effectively take upward forces exerted by the block and transmit those forces upwardly to top wall 24 of part 16. At its left end as viewed in FIG. 4, the element 33 may have a downwardly turned vertical flange 68 engageable with the upper left end portion of block 19 to assist in maintaining the relative positioning of the parts.

Both the block 19 and the annular tire portion 69 of wheel 18 are resiliently deformable by the weight of the unit 11 and by imposition of additional load or shock forces to the caster. Each of these elements 19 and 69 is formed of an appropriate elastomeric material, preferably neoprene rubber or the like. The material of block 19 is desirably substantially harder than the material of portion 69 of the wheel. More particularly, the elastomeric material of block 19 should in most instances have a Shore hardness on the Durometer A scale at least about 10 points higher (harder) than the elastomeric material of wheel portion 69. Optimally, the Shore hardness of block 19 should in most cases be between about 20 and 25 points higher on the A scale than portion 69 of the wheel. The Shore hardness of portion 69 is preferably between about 50 and 70 on the A scale, and the hardness of cushion block 19 is preferably between about 70 and 95 on the A scale. Also, the elastomeric material of cushion 19 is desirably selected to be highly non-linear in its resistance to deformation, so that the resistance offered by the cushion increases very rapidly as the cushion is compressed to take very high load forces without reaching a bottomed out condition.

To now describe the functioning of the caster under normal conditions and when subjected to excessive load forces, assume first of all that the unit 11 is at rest and supported on a number of the casters 10, in which condition the wheel and its mounting arm 17 are preferably in the position illustrated in FIGS. 1 and 4, desirably with the pressure plate portion 41 of part 17 disposed substantially horizontally as shown. In that condition if the unit is wheeled across a fairly smooth floor surface, the relatively soft elastomeric material of portion 69 of the wheel deforms readily upon contact with any irregularity, to effectively cushion such contact and avoid transmission of the shock forces to unit 11. Under these very low load forces, the harder block 19 deforms slightly, but not to the extent that the elastomeric material of the wheel deforms.

When the suspension system is subjected to a higher load, as for instance if the computer or other unit 11 and the connected casters are allowed to fall freely through a substantial distance and to then contact abruptly a floor surface after such a free fall, the soft elastomeric material of portion 69 of the wheel first deforms very substantially, with initially very slight deformation of block 19, followed by progressively increasing resilient deformation of that block as the force increases, and as the wheel carrying part 17 swings upwardly about its pivotal axis 35 toward a position such as that represented in broken lines in FIG. 4. As the pressure plate 41 of part 17 swings upwardly, it compresses the elastomeric material of block 19 vertically, and approaches the position represented at 41' in FIG. 4. In this connection, it is noted that in the full line normal essentially unloaded condition of FIG. 4 the two pressure plates 41 and 65 desirably flare progressively apart in a rightward direction as viewed in FIG. 4, that is, in a direction essentially away from pins 36 and 146 and their pivotal axes. As the load on the caster increases, the pressure plate 41 moves closer to a position of parallelism with respect to inclined upper pressure plate 65, and in that parallel relation is capable of transmitting compressive force to the block under extremely high load forces. Also, as the block 19 is compressed vertically, its initially flat side wall surfaces 56 and 57 and its end surfaces 55 and 70 are expanded outwardly as represented in broken lines at 56', 57', 55' and 70', to store a large amount of potential energy in the elastomeric material of the block. As the deformation of block 19 increases, resistance to further compression offered by the elastomeric material of the block correspondingly increases in a highly non-linear fashion, thereby enabling the cushion to absorb shock forces of very high value, say 20 G or more, without any bottoming out effect, and with some cushioning being attained even under the highest load condition, though in the very low load conditions as previously discussed the cushioning effect is softer.

Figure 6:
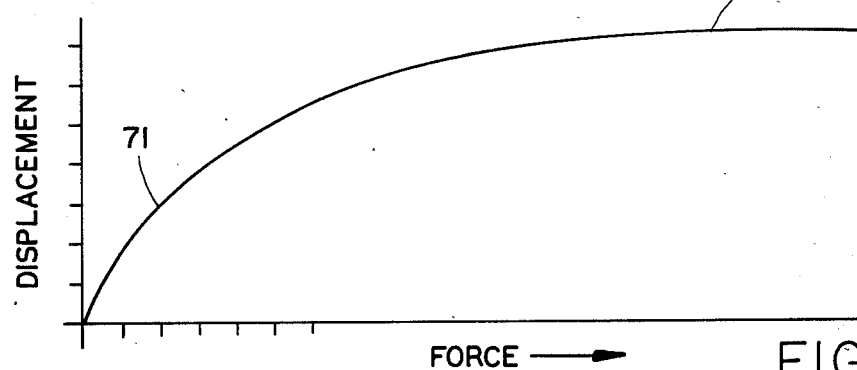
FIGS. 6 and 7 are graphs representing the shock absorbing characteristics of a castor embodying the invention.

FIG. 6 represents this effect graphically, plotting downward force applied by the supported unit 11 to body 16 of the caster against the downward displacement of body 16 and the supported unit 11 relative to floor surface 12 and under the influence of the applied force. As seen in FIG. 6, when the downward force is small, under light load conditions, a relatively small increase in force causes substantial downward displacement of caster body 14 and unit 11. This is represented by the rapidly rising portion of the curve identified by the number 71 of FIG. 6. As increased force causes progressively more compression of the elastomeric cushion 19, the amount of displacement per unit increase in force decreases progressively, and the curve of FIG. 6 progressively flattens out as represented at 72. The initially soft cushioning effect thus gradually converts to a much stiffer resilience capable of withstanding extremely high load forces such as may occur if the entire unit 11 and the casters are dropped through a substantial distance, or if a heavy weight is dropped on the unit 11.

Figure 7:
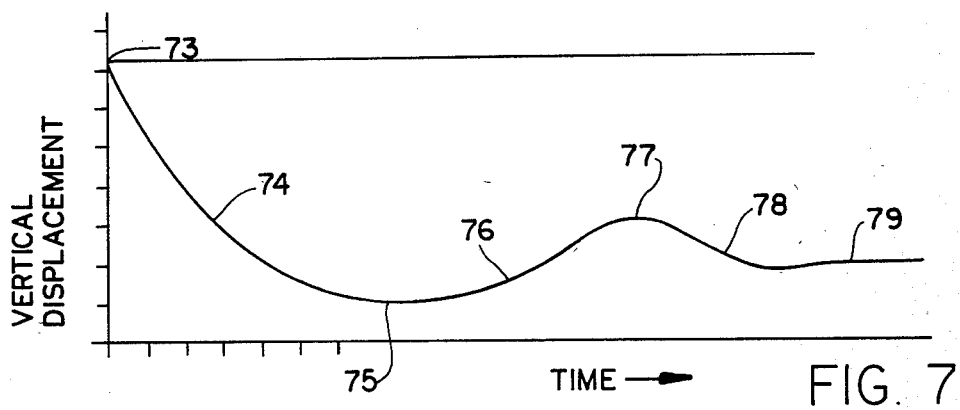

FIG. 7 represents graphically the vertical displacement of the center of gravity of unit 11 plotted against time, when the unit and its carried casters are dropped from a specified height. Zero time on the graph of FIG. 7 represents the instant that the wheels of a number of casters 10 strike the ground after the unit 11 and the casters have been dropped from the desired test height. At that point of contact the center of gravity of unit 11 continues its downward movement from the point 73 on the curve, with fairly rapid downward movement initially resisted by a relatively light cushioning force. As the cushioning force increases with further downward movement and further compression of cushion 19, the curve 74 of FIG. 7 advances more gradually downwardly, ultimately to a point 75 at which the maximum G load or acceleration is attained. From that point 75, the resilience of cushion 19 causes the center of gravity of unit 11 to rebound upwardly at 76, to a point 77, and then move downwardly again at 78 and ultimately dampen out as represented at 79. Preferably, the system is designed to dampen out as quickly as possible, a result which is achieved by internal friction (low "Q") in the elastomeric material of cushion 19, or if preferred by internal friction introduced by any convenient expedient into the mechanical linkage.

While a certain specific embodiment of the present invention has been disclosed as typical, the invention is of course not limited to this particular form, but rather is applicable broadly to all such variations as fall within the scope of the appended claims.

We claim:

1. A caster comprising:
   a first structure adapted to be connected to a unit to be supported and having a top wall and two spaced side walls projecting downwardly therefrom;
   a second structure connected to said side walls of said first structure for pivotal movement relative thereto about a generally horizontal first axis, and having a generally horizontally extending pressure plate portion spaced beneath said top wall of said first structure;
   a wheel connected to said second structure for rotation relative thereto about a generally horizontal second axis which is offset from said first axis in a direction acting, when a load is imposed on the wheel, to cause relative pivotal movement of said structures about said first axis with downward movement of said first structure relative to said wheel;
   a cushion formed of elastomeric material positioned beneath said top wall of said first structure and above said pressure plate portion of said second structure and adapted to be pressed downwardly against said pressure plate portion of said second structure; and
   an additional element interposed vertically between said top wall of said first structure and said cushion and having a pressure plate portion engageable with the upper side of said cushion and acting to compress and resiliently deform the cushion vertically between said pressure plate portions of said second structure and said additional element when a load is imposed on the wheel;
   said additional element having two side walls which project upwardly from opposite edges of said pressure plate portion of said additional element at inner sides of said two side walls of said first structure and which have upper extremities bearing upwardly against said top wall of said first structure in a relation maintaining said pressure plate portion of said additional element spaced beneath said top wall of said first structure and applying force downwardly from said top wall of said first structure through said side walls of said additional element to compress said cushion between the two pressure plate portions upon imposition of a load on the wheel.

2. A caster as recited in claim 1, in which said pressure plate portion of said additional element is inclined to advance angularly upwardly toward said top wall of said first structure.

3. A caster as recited in claim 1, in which said top wall of said first structure has downwardly turned ends engageable with said side walls of said additional element to locate said element against movement in opposite horizontal directions.

4. A caster as recited in claim 1, including a mounting member connected to said top wall of said first structure and adapted to attach said first structure to said unit to be supported, and a swivel connection securing said top wall of said first structure to said mounting member for relative pivotal movement about a vertical axis and projecting downwardly to a location between said two upwardly projecting side walls of said additional element.

5. A caster as recited in claim 1, in which said pressure plate portion of said additional element is inclined to advance angularly upwardly toward said top wall of said first structure, and said two upwardly projecting side walls of said additional element progressively decrease in vertical height as they advance horizontally, said top wall of said first structure having flanges turned downwardly at opposite ends of said additional element and engageable with said upwardly projecting side walls of said additional element to locate the element against movement in opposite horizontal directions, there being a mounting plate above said top wall of said first structure and connectable to said unit to be supported, and a swivel connection attaching said top wall of said first structure to said mounting plate for relative pivotal movement about a vertical axis and projecting downwardly beneath said top wall of said first structure and laterally between said two upwardly projecting side walls of said additional element.

6. A caster as recited in claim 1, in which said cushion has localized projections at two opposite sides thereof extending toward said spaced side walls of said first structure and engageable therewith to limit lateral deflection of said cushion, and projecting beyond other side portions of the cushions offset from said projections in a relation maintaining those other portions spaced from said side walls of the first structure.

7. A caster comprising:
   a first structure adapted to be connected to a unit to be supported and having a top wall and two spaced side walls projecting downwardly therefrom;
   a second structure connected to said side walls of said first structure for pivotal movement relative thereto about a generally horizontal first axis, and having a generally horizontally extending pressure plate portion spaced beneath said top wall of said first structure;
   a wheel connected to said second structure for rotation relative thereto about a generally horizontal second axis which is offset from said first axis in a direction acting, when a load is imposed on the wheel, to cause relative pivotal movement of said structure about said first axis with downward movement of said first structure relative to said wheel;
   a cushion formed of elastomeric material positioned beneath said top wall of said first structure and above said pressure plate portion of said second structure and adapted to be compressed and resiliently deformed upon said load induced relative pivotal movement of said structures;
   said cushion having side surfaces at opposite sides thereof which face toward said two side walls respectively of said first structure and which have projections formed of said elastomeric material extending farther toward said side walls of said first structure than do other portions of said side surfaces of the cushion so that said side surfaces engage said side walls of the first structure only locally at said projections to essentially center the block between the two side walls and in a relation maintaining said other portions of said side surfaces in spaced relation to said side walls of said first structure, said projections occupying only a minor portion of the area of each of the side surfaces of said cushion to leave the side surfaces of the cushion free for lateral expansion at other locations toward the side walls of the first structure upon vertical compression of the cushion.

8. A caster as recited in claim 7, in which said projections are convexly rounded.

9. A caster comprising:
a first structure adapted to be connected to a unit to be supported and having a top wall and two spaced side walls projecting downwardly therefrom;
a second structure having a generally horizontally extending pressure plate portion and having two side walls projecting downwardly therefrom;
a first pin extending horizontally through registering openings in said side walls of said first and second structures and connecting said structures together for relative pivotal movement about a generally horizontal first axis;
a wheel connected to said side walls of said second structure for rotation about a second axis offset from said first axis in a direction acting, when a load is imposed on the wheel, to cause relative pivotal movement of said structures about said first axis with downward movement of said first structure relative to the wheel;
a cushion formed of elastomeric material positioned beneath said top wall of said first structure and above said pressure plate portion of said second structure and adapted to be pressed downwardly against said pressure plate portion of said second structure upon imposition of a load;
a second pin extending through openings in said side walls of said first structure and extending through a passage in said cushion;
an additional element interposed vertically between said top wall of said first structure and said cushion and having a pressure plate portion engageable with the upper side of said cushion to compress and resiliently deform the cushion between said pressure plate portions when a load is imposed on the wheel;
said additional element having two side walls which project upwardly from opposite edges of said pressure plate portion of said additional element and at inner sides of said two side walls of said first structure and which have upper extremities bearing upwardly against said top wall of said first structure in a relation maintaining said pressure plate portion of said additional element spaced beneath said top wall of said first structure and compressing said cushion between the two pressure plates upon imposition of the load on the wheel;
said pressure plate portion of said additional element extending at an inclination upwardly toward said top wall of the first structure.

10. A caster as recited in claim 9, in which said cushion has opposite side surfaces with localized rounded projections extending farther than other portions of said side surfaces toward said two side walls respectively of said first structure.

11. A caster as recited in claim 10, in which said first pin is received beneath said pressure plate portion of said second structure and has an upper surface engaging an undersurface of said pressure plate portion of said second structure between said side walls of said second structure in load supporting relation.

* * * * *